(12) United States Patent
Wibowo et al.

(10) Patent No.: US 6,980,516 B1
(45) Date of Patent: Dec. 27, 2005

(54) SOFT, PRIORITIZED EARLY PACKET DISCARD SYSTEM

(75) Inventors: Eko-Adi Wibowo, Ottawa (CA); Jun Huang, Ottawa (CA)

(73) Assignee: SpaceBridge Semiconductor Corporation, Hull (CA)

( * ) Notice: Subject to any disclaimer, the term of this patent is extended or adjusted under 35 U.S.C. 154(b) by 0 days.

(21) Appl. No.: 09/470,787

(22) Filed: Dec. 23, 1999

(30) Foreign Application Priority Data

Aug. 6, 1999 (CA) ............................................ 2279728

(51) Int. Cl.[7] ........................ G01R 31/08; H04L 12/28; G06F 15/16
(52) U.S. Cl. .................... 370/235; 370/395.1; 370/413; 709/235
(58) Field of Search .......................... 370/395.1, 395.2, 370/395.21, 395.31, 395.4, 400, 410, 412, 413, 231, 229, 235, 236, 232, 234, 352; 709/235, 232, 233, 234

(56) References Cited

U.S. PATENT DOCUMENTS

| | | | |
|---|---|---|---|
| 5,426,640 A | | 6/1995 | Hluchyj et al. |
| 5,901,147 A | | 5/1999 | Joffe |
| 5,936,939 A | | 8/1999 | Des Jardins et al. |
| 6,141,323 A | * | 10/2000 | Rusu et al. .................. 370/236 |
| 6,246,687 B1 | * | 6/2001 | Siu ............................. 370/395 |
| 6,304,552 B1 | * | 10/2001 | Chapman et al. ........... 370/232 |
| 6,333,917 B1 | * | 12/2001 | Lyon et al. .................. 370/236 |
| 6,556,578 B1 | * | 4/2003 | Siberschatz et al. ........ 370/412 |

OTHER PUBLICATIONS

Hashem, E, "Analysis of Random Drop for Gateway Congestion Control", Report LCS TR–465, Laboratory for Computer Science, MIT Cambridge, MA, 1989.

G. J. Armitage, "Packet Reassembly During Cell Loss", IEEE Network, vol. 7, No. 9, Sep. 1993.

Jun Huang, "Soft–Bounded Policy for Congestion Control of Communication Network," IEEE PRC on CCSP, Vancouver, Canada, 1991.

Allyn Romanov and Sally Floyd, "Dynamics of TCP Traffic over ATM Network", IEEE JSAC, vol. 13, No. 4, May 1995, p. 633–641.

Sally Floyd and Van Jacobson, "Random Early Detection Gateways for Congestion Avoidance", IEEE/ACM Transactions on Networking, Aug. 1993.

(Continued)

*Primary Examiner*—Hanh Nguyen
(74) *Attorney, Agent, or Firm*—L. Anne Kinsman; Borden Ladner; Gervais LLP

(57) ABSTRACT

A Soft, Prioritised Early Packet Discard System is provided, which is suitable for satellite onboard switching and very-high-speed terrestrial switching applications. The system counts the number of newly arriving packets, calculates and regularly updates an average queue size, which is used in setting a packet-count threshold via a descending staircase function. When the number of newly arriving packets reaches the packet-count threshold and when the average queue size reaches or exceeds the congestion threshold; a packet is discarded and the packet-counter is reset to zero. The counting of packets is halted while the average queue size remains below the congestion threshold. The regular dropping of packets allows simplified hardware implementations. In calculating the average queue size, a progressively higher exponential queue-length averaging parameter is used for higher instantaneous queue length, to provide faster reaction to congestion situations. The averaging parameters and packet-count thresholds are implemented using lookup tables. A priority-based method is incorporated to better match the Quality of Service requirements associated with a service class.

30 Claims, 11 Drawing Sheets

OTHER PUBLICATIONS

B. Braden et al, "Recommendations on Queue Management and Congestion Avoidance in the Internet", RFC 2309, Apr. 1998.

Omar Elloumi and Hossam Afifi, "RED Algorithm in ATM Networks" Technical Report, Jun. 1997.

Rohit Goyal, "Traffic Management for TCP/IP over Asynchronous Transfer Mode (ATM) Networks", Ph.D. Dissertation, Department of Computer and Information Science, The Ohio State University, 1999.

Dong Lin and Robert Morris, "Dynamics of Random Early Detection", Proceedings of the ACM SIGCOMM '97, Sep. 1997.

* cited by examiner

| AvgBufCnt or BufCnt | PkCntThr | Alpha |
|---|---|---|
| 0 % - 6.25 % | 0 | 0.001953125 |
| 6.25 % - 12.5 % | 0 | 0.001953125 |
| 12.5 % - 18.75 % | 0 | 0.001953125 |
| 18.75 % - 25 % | 0 | 0.001953125 |
| 25 % - 31.25 % | 80 | 0.001953125 |
| 31.25 % - 37.5 % | 70 | 0.001953125 |
| 37.5 % - 43.75 % | 60 | 0.001953125 |
| 43.75 % - 50 % | 50 | 0.001953125 |
| 50 % - 56.25 % | 40 | 0.00390625 |
| 56.25 % - 62.5 % | 30 | 0.00390625 |
| 62.5 % - 68.75 % | 20 | 0.00390625 |
| 68.75 % - 75 % | 10 | 0.00390625 |
| 75 % - 81.25 % | 1 | 0.0078125 |
| 81.25 % - 87.5 % | 1 | 0.0078125 |
| 87.5 % - 93.75 % | 1 | 0.0078125 |
| 93.75 % - 100 % | 1 | 0.0078125 |
| CongThr : | 25% | |
| ClCntThr : | 210 cells | |
| Switch Buffer Size (per port) : | 8192 cells | |

Figure 7

SOFT, PRIORITIZED EARLY PACKET DISCARD SYSTEM

FIELD OF THE INVENTION

This invention generally relates to systems of discarding cells during congestion in an Asynchronous Transfer Mode (ATM) network, and is particularly concerned with a system based on Soft, Prioritised Early Packet Discard (SPEPD) method.

DESCRIPTION OF RELATED ART

As a result of the bursty nature of data traffic, and the fact that they have high propagation-delay products, future terrestrial and satellite Asynchronous Transfer Mode (ATM) networks will not be immune to congestion situations. As such, it is crucial that an effective congestion control method be implemented in such networks.

Depending upon channel conditions, congestion duration can vary from cell-level times, i.e. the length of time required to transmit a cell, to call-level times, i.e. the time it takes to transmit a call. Specific to cell-level congestion, a combination of a queuing discipline and a cell discard scheme is commonly utilized to minimize the intensity and duration of congestion.

A wealth of cell-discard methods is known in the art. Some of the relevant discard methods are described in the prior art references listed further below. The simplest of such methods is the Discard Tail (DT) method, as described in reference [1], where the switch simply discards cells arriving to a full buffer. A major weakness of the DT method is that receivers tend to request retransmission of incomplete packets, causing the retransmission of all the cells belonging to the packets that have some of their contents in the dropped cells. The request for retransmission occurs while the channel is still congested, introducing even more traffic into an already congested channel.

A Partial Packet Discard (PPD) method is described in reference [2], which is designed to alleviate the negative effect of re-transmission. In the PPD method, when a cell is discarded, subsequent cells of the same packet are also discarded, as a result, more buffer space is made available for whole packets. However, this does nothing to the rest of the cells in a packet if they are already in the queue's buffer memory. In a worst-case scenario, the last cell in a packet is the one that is dropped, meaning that an almost complete packet is transmitted immediately before a request is made for its retransmission.

An Early Packet Discard (EPD) method is described in reference [3], which enhances the PPD method by discarding whole packets, instead of partial ones, so that buffer space is used only by whole packets. In the EPD method, a fixed threshold on the queue size is set, above which the switch starts to discard complete packets. Although in the majority of cases the EPD method performs better than the PPD method, its performance depends on proper selection of a queue threshold level. The queue threshold should be selected to avoid wasting buffer space, which happens if the threshold is set too low, or the partial discarding of a packet, which happens if the threshold is set too high, assuming the PPD method is executed when the buffer is full. The expected number of active connections and the average packet size typically determine this threshold. Unfortunately, both these numbers are difficult to estimate in practice. The use of a fixed threshold has another disadvantage when using Transmission Control Protocol (TCP). TCP detects congestion only after a packet has been dropped. Due to the fixed threshold used in EPD, the switch tends to discard packets successively, resulting in many TCP connections reducing their window size simultaneously, i.e. global synchronization. Since the speed of TCP congestion recovery is heavily dependent on the round-trip delay, the effect of global synchronization on throughput is more significant in satellite networks and in high-speed, long-delay terrestrial networks.

A Random Early Discard (RED) method is described in both references [4] and [5]. The RED method is designed for networks, whose underlying transport protocol is TCP-like, i.e. where a dropped packet is sufficient to indicate congestion to the source. Due to the growth of the Internet, an increased amount of traffic carried by current and future ATM networks will be Internet Protocol (IP) traffic, and by extension TCP traffic as well. Therefore, the RED method has been considered for implementation in ATM switches, as described in reference [6]. In the RED method, the switch randomly chooses packets to discard when the average queue size is between a minimum and a maximum queue thresholds. With RED, the number of packets discarded is proportional to the average queue size. The RED method successfully avoids global synchronization problems and maintains a low average queue size.

A major weakness of the RED method is that its algorithm is computation-intensive. Furthermore, anticipating that the distribution of traffic is random, it is often unnecessary to perform computationally expensive calculations of drop probability to further randomize the discarding of packets.

All of the above mentioned methods share a common problem of unfairness. Specifically, assuming that both non-TCP-like and TCP-like connections share the same service class and that per-class queuing is used in the switch, the throughput of non-TCP-like connections is expected to be greater than that of TCP-like connections.

An EPD method with Selective Discard (SD) or Fair Buffer Allocation (FBA), is described in reference [7]. While this approach may successfully avoid the problem of unfairness, it does so at the cost of an increase in both memory (and memory bandwidth) requirements and computational complexity due to the use of per-Virtual-Circuit (VC) accounting. A Flow RED method, which is described in reference [8], uses a similar approach to provide equal treatment to non-TCP-like and TCP-like connections, but also imposes a computational penalty in doing so.

There have been attempts to solve some of the existing problems by implementing a variable threshold to the standard discard methods. One such example is disclosed in U.S. Pat. No. 5,901,147, which adjusts the discard threshold as a function of the number of queues in use, and the occupancy of those queues. This method however still uses the standard EPD techniques to discard complete packets or frames whenever the threshold value is exceeded. This still results in the global TCP synchronization problem resulting in lowered TCP throughput mentioned earlier.

A second example of a method utilizing a variable threshold is that disclosed in U.S. Pat. No. 5,936,939, which uses statistics such as the arrival and departure rate to set the threshold level. This method also uses the typical EPD methodology, which causes the aforementioned TCP related problems.

A third example of a variable threshold method is disclosed in U.S. Pat. No. 5,426,640, which provides an end-to-end congestion control scheme. In this scheme, packet discards are spread over many nodes in a given path so as to reduce overall congestion. Though this does not directly address TCP concerns it may in fact resolve some of these issues, but the link between the method and objective has not yet been established. A drawback of this system is that it is an end-to-end method that requires control and management of every node in the system. As a result it cannot be implemented at a given node on the network without controlling the rest of the nodes.

There is therefore a need for a fast, simple and fair packet discard method, which is more effective for TCP-like connections and for satellite and very-high-speed terrestrial communication environment with mixed types of traffic.

Sources of relevant prior art information include the following:
[1] Hashem E., "Analysis of Random Drop for Gateway Congestion Control", Report LCS TR-465, Laboratory for Computer Science, MIT, Cambridge, Mass., 1989;
[2] G. J. Armitage, "Packet Reassembly During Cell Loss", IEEE Network, Vol. 7, No. 9, September 1993;
[3] Allyn Romanov and Sally Floyd, "Dynamics of TCP Traffic over ATM Network", IEEE JSAC, Vol. 13 No. 4, May 1995, pg. 633–641;
[4] Sally Floyd and Van Jacobson, "Random Early Detection Gateways for Congestion Avoidance", IEEE/ACM Transactions on Networking. August 1993;
[5] B. Braden et. Al, "Recommendations on Queue Management and Congestion Avoidance in the Internet", RFC 2309, April 1998;
[6] Omar Elloumi and Hossam Afifi, "RED Algorithm in ATM Networks" Technical Report, June 1997;
[7] Rohit Goyal, "Traffic Management for TCP/IP over Asynchronous Transfer Mode (ATM) Networks", Ph.D. Dissertation, Department of Computer and Information Science, The Ohio State University, 1999;
[8] Dong Lin and Robert Morris, "Dynamics of Random Early Detection", Proceedings of the ACM SIGCOMM '97, September 1997; and
[9] Jun Huang, "Soft-Bounded Policy for Congestion Control of Communication Network,"IEEE PRC on CCSP, Vancouver, Canada, 1991.

For reader's convenience, a glossary of acronyms used in this description is given below.

| ABR | Available Bit Rate |
|---|---|
| ATM | Asynchronous Transfer Mode |
| CLR | Cell Loss Ratio |
| EOP | End of Packet |
| EPD | Early Packet Discard |
| FBA | Fair Buffer Allocation |
| FTP | File Transfer Protocol |
| GEO | Geo-stationary |
| GFR | Guaranteed Frame Rate |
| IP | Internet Protocol |
| MSB | Most Significant Bit |
| PPD | Partial Packet Discard |
| QoS | Quality of Service |
| RED | Random Early Discard |
| RFC | Request For Comment |
| SD | Selective Discard |
| SPEPD | Soft, Prioritised Early Packet Discard |
| TCP | Transmission Control Protocol |
| UBR | Unspecified Bit Rate |
| VBR | Variable Bit Rate |
| VPN | Virtual Private Network |
| WUBR | Weighted Unspecified Bit Rate |

SUMMARY OF THE INVENTION

In packet based and other connectionless networks, such as computer networks, conventional congestion control methods are based on selectively discarding packets or equivalently adjusting buffer size according to the level of congestion. Under the normal loading circumstances of transmission systems no packets are discarded, but under heavy traffic conditions packet loss is common, and the levels of packet loss depend upon the bandwidth required by the traffic. Similarly for connection-oriented networks, congestion control methods are partially based on denying new calls as a result of the high level of congestion in the system.

Congestion in most networks is a dynamic phenomenon, not a static resource issue. Packet loss due to buffer shortage and packet delay due to buffer sufficiency are symptoms, not causes of congestion. The causes of congestion can be found in the stochastic properties of the traffic. If the system traffic can be deterministically modelled, congestion problems would not occur.

Therefore, it is an object of this invention to provide a packet discard method that will facilitate the creation of the dynamic resources needed to remedy the problem associated with prior art solutions. Another object of this invention is to reduce the fluctuation of the demand for the aforementioned resources, instead of simply attempting to create a resource or reducing demands. It is yet another object of this invention to provide a better efficiency than the conventional EPD method. A further object of this invention is to solve the throughput-reducing global synchronization problem associated with TCP. In addition, it is an object of this invention to introduce a priority-based method to better match the Quality of Service (QoS) requirements associated with a service class. Finally, it is an object of this invention to provide a Soft Prioritised Early Packet Discard (SPEPD) method, which combines the simplicity of EPD and the effectiveness of RED for TCP-like connections.

In accordance with an aspect of the present invention there is provided a system for controlling traffic congestion within a buffered data switching network having a predetermined total buffer size, said system comprising:
(a) a packet counter for counting the number of newly arriving packets; and
(b) threshold means for setting a packet-count threshold; wherein when the number of newly arriving packets reaches the packet-count threshold and when the average queue size exceeds the congestion threshold, a packet is discarded and the packet counter is reset to a zero count.

In an embodiment of the present invention, the system further comprises calculation means for calculating an average queue size to be used by the threshold means in setting the packet-count threshold. Preferably, the calculation means regularly updates the average queue size using an exponential averaging technique, wherein the average queue size at time t is calculated as:

$$\overline{Q}_t = \overline{Q}_{t-1} \times (1-\text{Alpha}) + Q_t \times \text{Alpha},$$

where $Q_t$ is an instantaneous queue size and $\overline{Q}_{t-1}$ is the average queue size at time t−1, and Alpha is a queue-length averaging parameter assigned a value between zero and one. A progressively increasing value of Alpha is assigned with increasing level of traffic congestion, as indicated by the instantaneous queue size.

Conveniently, the average queue size is updated after a predetermined number of cells have arrived since a previous packet discard. Alternatively, the average queue size is updated after a predetermined period of time has elapsed since a previous packet discard.

A preferred embodiment further comprises means for dividing the total queue size into a pre-selected number of N regions, wherein the threshold means sets the packet-count threshold by using a descending staircase function F(n), such that one of every F(n) packets is discarded, when the average queue size is in a buffer region n, $1 \leq n \leq N$. This preferred embodiment further comprises means for detecting traffic congestion by setting a congestion threshold and comparing the average queue size with the congestion threshold, such that a congestion condition is indicated by the average queue size being equal to or above the congestion threshold, and an absence of congestion is indicated otherwise. The packet is discarded only during the congestion condition. The packet counter begins to operate when traffic congestion is detected, and halts operation when an absence of traffic congestion is detected.

An alternative embodiment further comprises means for dividing the total queue size into a pre-selected number of M regions, for high-priority traffic defining a high-priority congestion threshold, and a pre-selected number of N regions for low-priority traffic defining a low-priority congestion threshold, wherein the threshold means sets the packet-count threshold by using two functions F(n,m) and F(m), such that:

when the average queue size of high-priority traffic is above the high-priority congestion threshold and is in the buffer region m, $1 \leq m \leq M$, one of every F(m) high priority packets is discarded; and when the average queue size of low-priority traffic is above the low-priority congestion threshold and is in the buffer region n, $1 \leq n \leq N$, one of every F(n,m) low priority packets is discarded. The function F(m) is a descending staircase function in the buffer region m, and the function F(n,m), is a multivariable function of m and n, which has a descending staircase behaviour in the buffer region n for a fixed value of m.

Optionally, the system further comprises means for applying a priority scheme for discarding packets, which provides a differentiated service among service classes sharing a common buffer.

Also optionally, the threshold means uses a look-up table, and sets the packet-count threshold upon arrival of a new packet into the system. Alternatively, the threshold means sets the packet-count threshold upon departure of a packet from the system.

In accordance with another aspect of the present invention, there is provided a method for controlling traffic congestion within a buffered data switching network having a predetermined total buffer size, said method comprising the steps of:

(a) counting the number of newly arriving packets;
(b) setting a packet-count threshold; and
(c) discarding a packet and resetting the packet-counter, when the number of newly arriving packets reaches the packet-count threshold and the average queue size exceeds the congestion threshold.

In another embodiment of the present invention, the method further comprises a step of calculating an average queue size to be used by the step of setting the packet-count threshold. Preferably, the calculating step regularly updates the average queue size using an exponential averaging technique, wherein the average queue size at time t is calculated as:

$$\overline{Q}_t = \overline{Q}_{t-1} \times (1-\text{Alpha}) + Q_t \times \text{Alpha},$$

where $Q_t$ is an instantaneous queue size and $\overline{Q}_{t-1}$ is the average queue size at time t−1, and Alpha is a queue-length averaging parameter assigned a value between zero and one.

A progressively increasing value of Alpha is assigned with increasing level of traffic congestion, as indicated by the instantaneous queue size.

Conveniently, the average queue size is updated after a predetermined number of cells have arrived since a previous packet discard. Alternatively, the average queue size is updated after a predetermined period of time has elapsed since a previous packet discard. Another preferred embodiment further comprises a step of dividing the total buffer size into a pre-selected number of N regions, wherein the setting step sets the packet-count threshold by using a descending staircase function F(n), such that one of every F(n) packets is discarded, when the average queue size is in a buffer region n, $1 \leq n \leq N$. This preferred embodiment further comprises a step of detecting traffic congestion by setting a congestion threshold and comparing the average queue size with the congestion threshold, such that a congestion condition is indicated by the average queue size being above the congestion threshold, and an absence of congestion is indicated otherwise. The packet is discarded only during the congestion condition. The packet counter begins to operate when traffic congestion is detected, and halts operation when an absence of traffic congestion is detected.

Another alternative embodiment further comprises a step of dividing the total buffer size into a pre-selected number of M regions, for high-priority traffic defining a high-priority congestion threshold, and a pre-selected number of N regions for low-priority traffic defining a low-priority congestion threshold, wherein the setting step sets the packet-count threshold by using two functions F(n,m) and F(m), such that:

when the average queue size of high-priority traffic is above the high-priority congestion threshold and is in the buffer region m, $1 \leq m \leq M$, one of every F(m) high priority packets is discarded; and when the average queue size of low-priority traffic is above the low-priority congestion threshold and is in the buffer region n, $1 \leq n \leq N$, one of every F(n,m) low priority packets is discarded. Here, the function F(m) is a descending staircase function in the buffer region m, and the function F(n,m), is a multivariable function of m and n, which has a descending staircase behaviour in the buffer region n for a fixed value of m.

Optionally, the method further comprises a step of applying a priority scheme for discarding packets, which provides a differentiated service among service classes sharing a common buffer.

The SPEPD method is a congestion control method suitable for satellite onboard switch and very-high-speed terrestrial switch implementation, but its principle can be applied in various switches, terminals and gateways. The method is especially designed for the access cards, i.e. input or output interface cards, of the satellite onboard switch where design simplicity is a critical requirement. SPEPD is intended for Guaranteed Frame Rate (GFR), Available Bit Rate (ABR), Unspecified Bit Rate (UBR) and the forthcoming Weighted UBR (WUBR) service classes.

The SPEPD method is capable of reducing the amount of buffer space required on a switch, hence the cost of a switch, with its active buffer management while providing better performance than the conventional EPD method. Furthermore, its RED-like method brings about improved TCP throughput. In addition, the SPEPD method provides a general-purpose solution, which is effective for mixed-traffic environment due to its use of priority and its non-TCP-specific method.

The SPEPD method offers four main advantages over conventional methods:
a) fast-response active queue management system;
b) simple hardware implementation;
c) packet-level prioritised discard scheme; and
d) flexibility.

Unlike the RED method, the SPEPD method uses a progressively higher exponential queue-length averaging parameter for higher instantaneous queue length, a strategy that results in a faster reaction to congestion situations, which is critical for a high-speed switch or a switch with a very limited buffer memory. Furthermore, the SPEPD method uses a more regular means of updating the average queue size. This strategy provides several advantages to the RED strategy of updating the average queue size at every packet arrival, i.e. at the arrival of the start- or end-of-packet cell, including:

i) faster reaction to congestion situation;
ii) more regular updates of average queue size to avoid sudden jumps or drops in the average value; and
iii) avoiding a worst case situation where updates have to be performed rapidly due to successive arrivals of start- or end-of-packet cells.

Unlike the random drop strategy of RED, the SPEPD method uses a strategy of dropping packets regularly which allows a simplified hardware implementation. As a result, the complexities of both the calculation of the random drop probability as well as the calculation used to determine whether or not to perform packet discard are greatly reduced. The risk of service unfairness from dropping packets regularly can be ignored for the following reasons.

The risk of service unfairness, that is, the risk of discarding successive packets from a given connection, will be negligible in the environment where a soft prioritised early packet discard (SPEPD) system will typically find use, i.e. high-speed core network elements in broadband networks. In such an environment, the risk of service unfairness is negligible because the average buffer occupancy level, the size of packets and the number of active connections tend to fluctuate rapidly. Furthermore, in addition to the three above factors, the high level of multiplexing in such network elements results in a high probability that the arrival of packets is sufficiently randomised to become pseudo-random in nature and thereby avoid service unfairness.

The SPEPD method introduces priority to provide differentiated service among service classes sharing a common buffer pool or among service groups sharing a common service class buffer space which allows a prioritised packet level discard. This strategy also provides a base for efficient buffer management for future applications and services, such as Virtual Private Networks (VPN). The SPEPD method can be optionally enhanced with per-Virtual Channel (VC) accounting to provide further fair treatment to both TCP-like and non-TCP-like connections.

In SPEPD, queue-length averaging parameters and packet-count thresholds are implemented using a lookup table or tables. These parameters can then be readily fine-tuned to suit observed traffic characteristics and available buffer space, to allow greater flexibility in the implementation.

The SPEPD method also improves upon the RED method by halting the counting of packets while the average queue size is below the congestion threshold. In contrast, the strategy with RED is to reset the packet counter to zero whenever the average queue size value is below the minimum threshold. Halting the counting of packets with SPEPD improves upon the count-reset scheme used by RED by preventing the system from having an overly slow response to congestion. The halting of the packet count with SPEPD also prevents an overly rapid response to congestion caused by a continuing count of packets.

A queue-length averaging parameter in the form of a weighting factor Alpha is used with both RED and SPEPD in the calculation of the average queue size. Optimal queue size varies with several factors, including the level of congestion in the system, which makes a fixed Alpha undesirable. The SPEPD method uses a variable Alpha to allow a performance closer to optimal levels than the fixed Alpha value of RED would allow.

The strategy for triggering the update of average queue size is another differentiating characteristic of SPEPD. With RED, the average queue size is updated whenever a new packet arrives, which is equivalent to updating the average queue size whenever a start-of-packet cell arrives. Therefore, when start-of-packet cells arrive successively, the average queue size value will be updated a number of times in a very short interval, bringing about rapid fluctuations in the value of the average queue size, which would diminish the accuracy of the average value. The SPEPD scheme avoids this problem by conducting more regular updates of the average value.

BRIEF DESCRIPTION OF THE DRAWINGS

Exemplary embodiments of the invention will now be further described with references to the drawings in which same reference numerals designate similar parts throughout the figures thereof, and wherein:

FIG. 7 illustrates, in a table, the parameters used in the SPEPD simulation, showing the correlation between either the queue size or the average queue size and Alpha values with varying Packet threshold values;

DETAILED DESCRIPTION OF THE INVENTION

This invention modifies the Prior art method of soft-bounded congestion control, which is described in reference [9], in order to create a simple dynamic threshold EPD, herein referred to as Soft Prioritised Early Packet Discard (SPEPD).

A formal description of the soft-bounded congestion control is as follows. Let K* denote the state of the network without the dynamic control of station capacities, then $K^*=(k_1^*, k_2^*, \ldots, k_L^*)$ where $k_i^*$ is the number of packets in the $i^{th}$ station, $1 \leq i \leq L$. After the control of the buffer size is applied, it becomes clear that all states represented by K* are not feasible. The normalization of the infeasible states is essential. The packet distribution in each state is adapted to the capacity limit of each station in the blocking network by the function f(k*)=(k), where (k) is the normalised state for the blocking network. The function f(·) maps the non-feasible state (k*) to the feasible state (k). As a result, the Markovian property of the packet flow is preserved.

The modifications that are done to create a dynamic threshold EPD method in accordance with this invention are now described. The total buffer size is divided into N regions. When the average queue size is above a threshold that indicates congestion, henceforth referred to as congestion threshold for conciseness, and is in the buffer region n, $1 \leq n \leq N$, one of every F(n) packets will be discarded, where F(n) is a descending staircase function of n defining the frequency of packet discard operations, also referred to herein as packet-count threshold, in accordance with an embodiment of this invention using a single variable packet-count threshold determination algorithm. An exemplary embodiment of the function F(n) is given in FIG. 1 which graphically illustrates the single variable threshold determination algorithm. This strategy of discarding packets regularly provides for simple hardware implementation.

Figure 1:
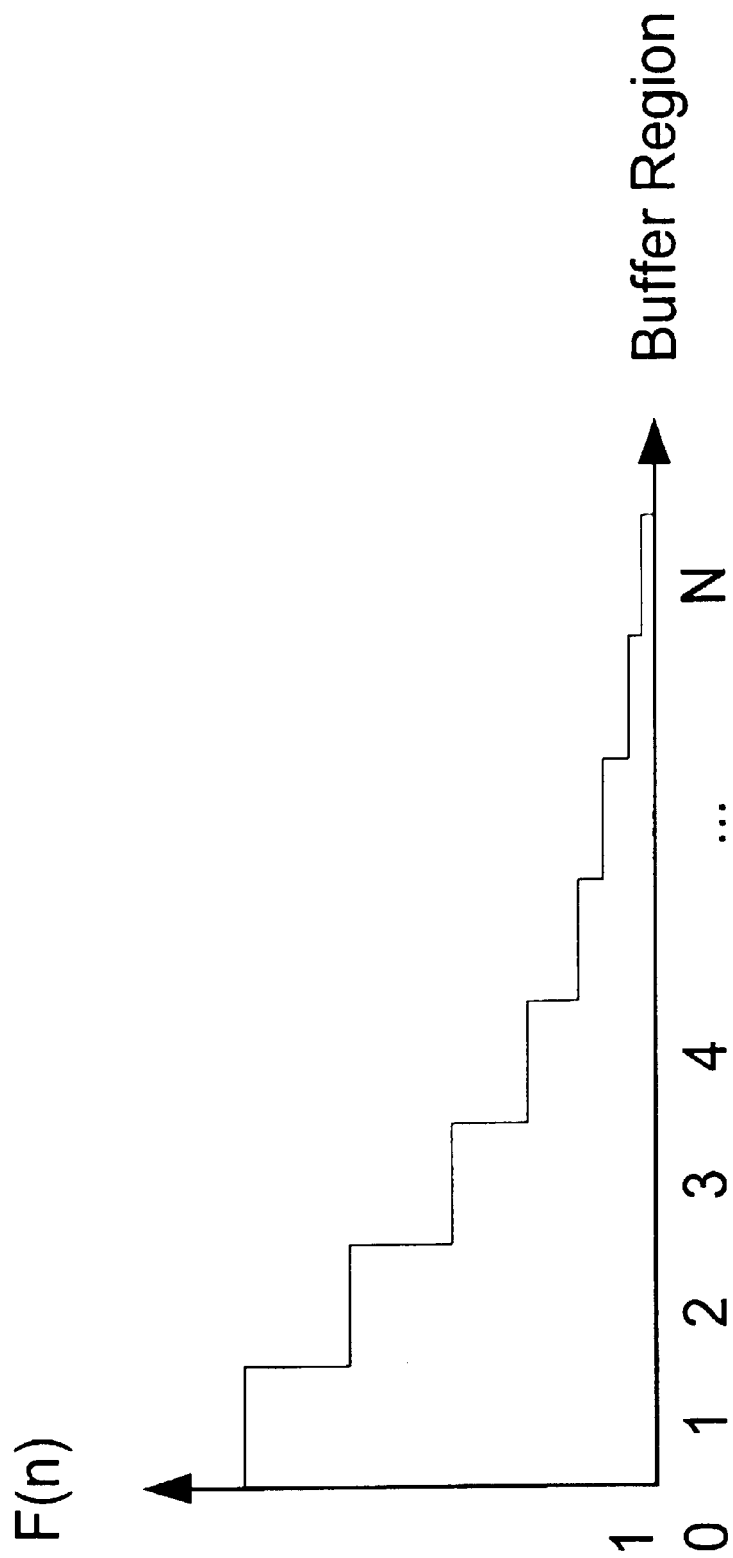
FIG. 1 graphically illustrates a single variable threshold determination algorithm in accordance with an embodiment of this invention, wherein the total buffer size is divided into N regions, and the frequency of packet discard operations is depicted as a descending staircase function F(n), $1 \leq n \leq N$.

As shown in FIG. 1, F(n) has high values for low average queue sizes. This is designed to address the problem of global synchronization of TCP connections. By allowing adequate spacing between two packet discards, it is likely that only one TCP connection will be forced to reduce its window size at a given time. As a result of this spacing, the overall TCP throughput will not be significantly affected in the vast majority of situations. On the other hand, the function F(n) has lower values for higher average queue sizes, which is aimed at making a certain amount of buffer space available to store packets during bursty periods in transmissions. As a result, partial packet discards, which can quickly trigger the global synchronization problem, are avoided.

In order to perform packet discard at regular intervals, SPEPD counts the number of packets that have arrived in the system since the last packet discard event. When the number of new packets is equal to the current value of the function F(n), the newly arriving packet is discarded. The counting of packets is halted whenever the average queue size is below the congestion threshold.

The averaging of the queue size is achieved using an exponential averaging scheme similar to the one employed by RED. The average queue size $\overline{Q}_t$ at time t is calculated using the function $$\overline{Q}_t = \overline{Q}_{t-1} \times (1-\text{Alpha}) + Q_t \times \text{Alpha},$$

where $Q_t$ is the instantaneous queue size and $\overline{Q}_{t-1}$ is the average queue size at time t-1, and Alpha is a weighting factor assigned a value between zero and one, referred to herein as the queue-length averaging parameter, that expresses the importance of the instantaneous queue size with respect to the average queue size. A high Alpha value (close to 1) means the instantaneous value is weighted more heavily in the calculation of the average queue size value, which thereby reduces the importance of past instantaneous values. A low Alpha value (close to 0) increases the importance of past instantaneous values at the expense of current values. Thus, the degree of fluctuation in the average queue size value is significantly affected by the choice of Alpha.

The SPEPD method uses a progressively increasing value of Alpha as congestion worsens. This varying weighting factor Alpha is a key strategy in this approach and it addresses the shortcomings of the RED method with respect to the speed of response to congestion situation. The SPEPD method uses a low value of Alpha when the instantaneous queue size is low, in order to diminish the role of the instantaneous queue value in the calculation so that the system is able to react faster to more severely congested future situations. Conversely, the SPEPD method uses a value of Alpha approaching 1 when the instantaneous queue size is high. The high value of Alpha increases the importance of the instantaneous queue size value in the calculation so that the system is able to respond quickly to current congestion situations. Furthermore, the decrease in response times translates to a reduction in the amount of buffer space required for the SPEPD method to work effectively, which makes SPEPD suitable for environments where hardware resources are very limited, such as for a near-terabit terrestrial switch or a satellite onboard switch.

The SPEPD method conducts updates of the average queue size value at regular intervals to avoid overly rapid fluctuations in queue size. There are two alternatives for achieving this goal, one is to perform an update after a predetermined number of cells (or packets in packet-based switches) have arrived since the previous packet discard event. The second alternative is to perform an update after a predetermined amount of time has elapsed since the previous packet discard event. Either alternative falls within the scope and nature of the invention.

Figure 3:
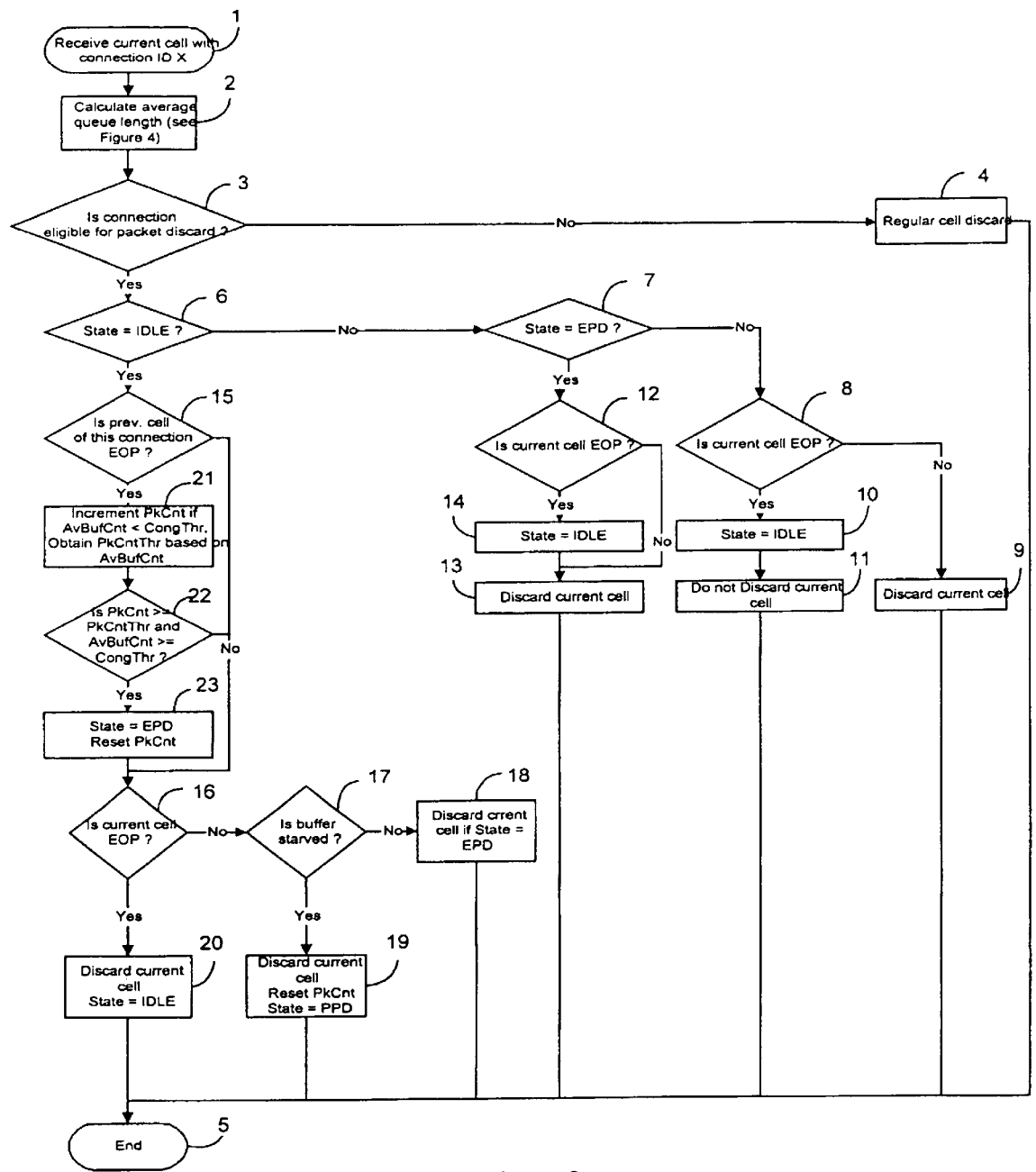
FIG. 3 illustrates in a flowchart, a Single-Priority SPEPD embodiment of this invention.
Figure 4:
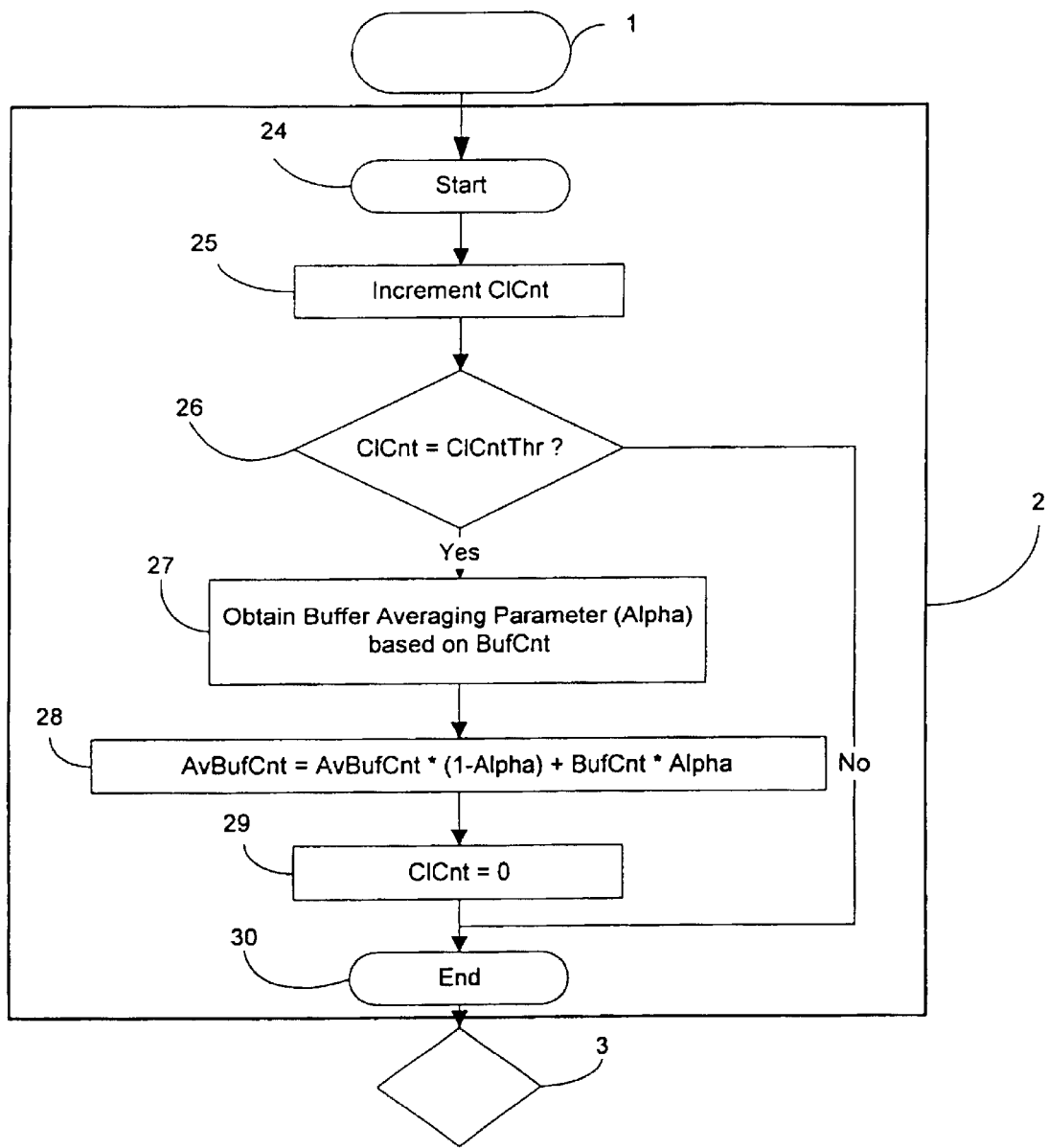
FIG. 4 illustrates, in a flowchart, details of the step of calculating the average queue length shown in FIG. 3.

Two flowcharts describing an SPEPD embodiment using the first alternative of update triggering are given in FIGS. 3 and 4. As shown in FIG. 3, a first step 1 is to receive a current cell and read its connection ID. The average queue length is determined by a second step 2. The process within the second step 2 is described in more depth by the flowchart illustrated in FIG. 4. A determination of whether or not the packet is eligible for packet discard is made by a third step 3. If the cell is not eligible, a regular cell discard method is executed by a fourth step 4, and the process ends by a termination step 5. If otherwise, the cell is eligible for packet discard then the state of the connection is examined by a sixth step 6 to see if it is IDLE. If the state of the connection is not IDLE, the system checks in a seventh step 7 to see if it is EPD. If otherwise the connection's state is not EPD, a check is performed by an eighth step 8 to see if the current cell is the end of a packet (EOP). If the current cell is not EOP, it is discarded by a ninth step 9 and the process ends by the termination step 5. If otherwise it is EOP, the state of the connection is set as IDLE by a tenth step 10, and a decision is made by an eleventh step 11 not to discard the current cell, and the process ends by the termination step 5.

If the seventh step 7 indicates that the state of the system is EPD, then the current cell is checked by a twelfth step 12 to see if it is EOP. If it is not EOP, the current cell is discarded by a thirteenth step 13 and the process ends by the termination step 5. If otherwise the cell is EOP, the connection state is set to IDLE by a fourteenth step 14, the cell is discarded by the thirteenth step 13 and the process ends by the termination step 5.

If the sixth step 6 indicates that the connection state was IDLE when a packet entered the system and the cell is eligible for packet discard, a fifteenth step 15 checks if the previous cell in the connection was EOP. If not, a sixteenth step 16 examines the current cell to see if it is EOP. If not, a seventeenth step 17 checks for buffer starvation. If the buffer is not starved, the cell is discarded by an eighteenth step 18 when the connection's state is EPD, and the process ends by the termination step 5. If otherwise the buffer is starved, then a nineteenth step 19 discards the current cell, resets the packet count, and sets the connection's state to PPD, after which the process ends by the termination step 5.

If the sixteenth step 16 indicates that the current cell is EOP, then a twentieth step 20 discards the cell when the connection's state is EPD, a twenty-fourth step 24 sets the connection's state to IDLE and the process ends with the termination step 5.

If the fifteenth step 15 indicates that the previous cell in the connection was EOP, then a twenty-first step 21 increments the packet count if the average queue size is equal to or higher than the congestion threshold, and then obtains a packet-count threshold based on the average queue size. A twenty-second step 22 then compares the packet count with the packet-count threshold, and compares the average queue size with the congestion threshold, which is derived from the function F(n) as shown in FIG. 1. If either the packet count or the average queue size is less than its respective threshold, then the sixteenth step 16 examines the current cell to see whether or not it is EOP. If both the packet count and the average queue size is equal to or higher than its respective threshold, then a twenty-third step 23 sets the connection's state to EPD and resets the packet count to zero, which is then followed by the sixteenth step 16. Based on the outcome of the sixteenth step 16, one of the three alternative paths described above is followed; namely the twentieth step 20 followed by the twenty-fourth step 24, or the seventeenth step 17 followed by either the eighteenth step 18 or the nineteenth step 19. All three such paths are then terminated by the termination step 5.

FIG. 4 illustrates in more details the process carried out by the second step 2 shown in FIG. 3 that is used to determine the average queue length. The process begins with an incrementing step 25, which increments the cell count. A comparison step 26 then compares the cell count to the cell count threshold. If they are not equal, the process continues to the third step 3. If otherwise they are equal then a first computation step 27 obtains a queue-length averaging parameter called Alpha from the instantaneous queue size. Then a second computation step 28 calculates the average queue size value as the old value of the average queue size times (1-Alpha) added to the instantaneous queue size value times Alpha. A resetting step 29 resets the cell counter to zero and the process continues to the third step 3.

In alternative embodiments, the SPEPD system is optionally augmented with a priority scheme allowing differentiated service among any one of the service classes sharing a common buffer pool, or alternatively among service groups sharing a common service class buffer space. This priority scheme provides a base for efficient buffer management for future applications and services, such as Virtual Private Networks (VPN).

Figure 2:
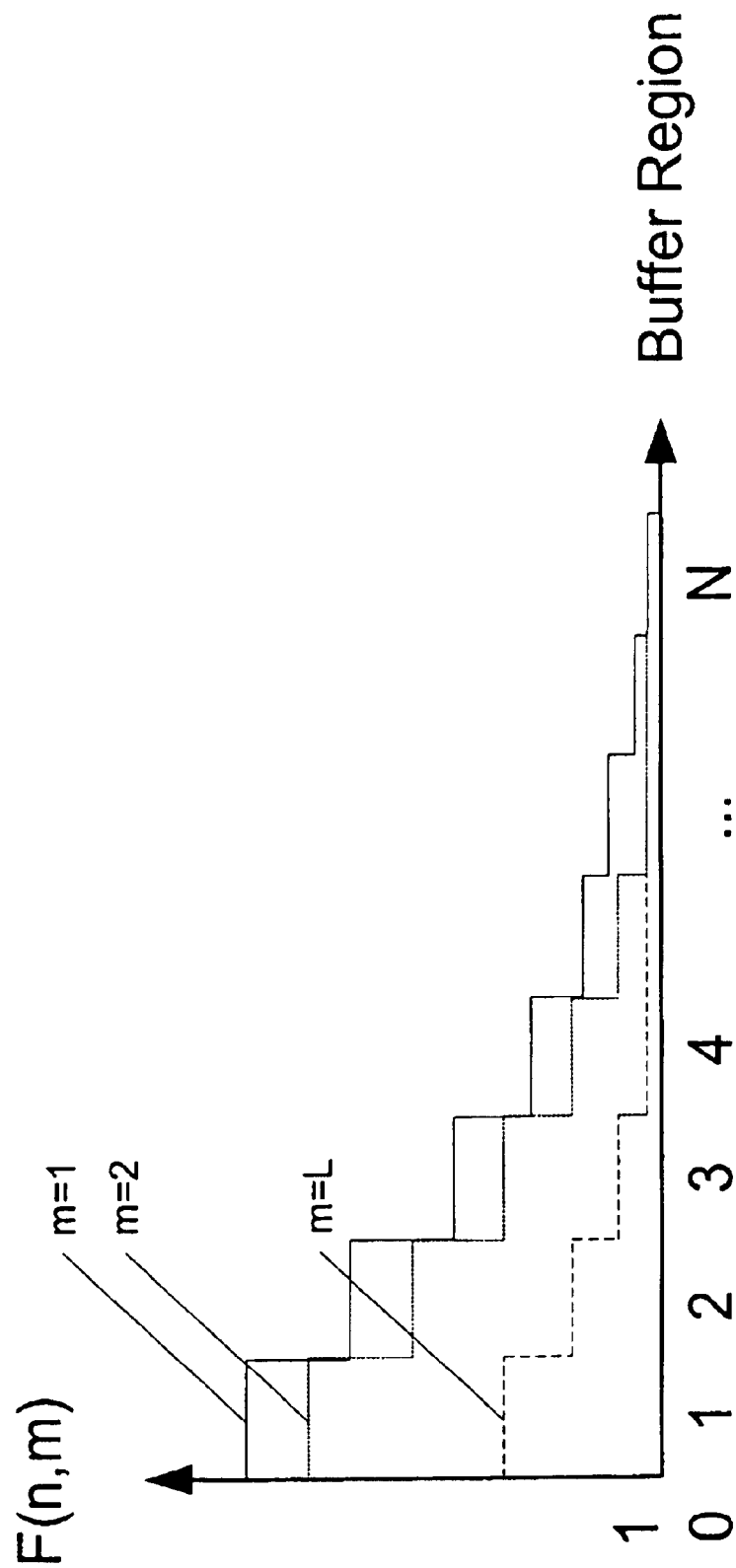
FIG. 2 graphically illustrates a multivariable threshold determination algorithm in accordance with another embodiment of this invention, wherein the total buffer size is divided into M regions for high-priority traffic, and into N regions for low-priority traffic, and the frequency of packet discard operations for low-priority traffic is depicted as a function F(n,m), $1 \leq n \leq N$ and $1 \leq m \leq M$.

The following describes an exemplary embodiment that supports the sharing of buffer space between two priority classes of traffic in accordance with this invention. The total buffer size is divided into M regions for high-priority traffic, and into N regions for low-priority traffic. Each of these two types of traffic has a corresponding congestion threshold. When the average queue size of high-priority traffic is above the corresponding congestion threshold and is in the buffer region m, $1 \leq m \leq M$, one of every F(m) high-priority packets is discarded. Also, when the average queue size of low-priority traffic is above the corresponding congestion threshold and is in the buffer region n, $1 \leq n \leq N$, one of every F(n,m) low-priority packets is discarded. Here, F(m) is a descending staircase function similar to that given in FIG. 1, while the function F(n,m), as illustrated in FIG. 2 is a multivariable function dependant upon both m and n. For a fixed value of m, the function retains a descending staircase behaviour with varying n values.

In order to illustrate a hardware embodiment of SPEPD, an implementation of the single-priority version of SPEPD with arrival-based triggering of queue-length averaging update is described in detail herein. The total buffer size is divided into N=16 equal regions. The values of the function F(n) are denoted as PkCntThr (the packet-count threshold). This function is implemented as a lookup table to provide a reduced computational complexity for this embodiment, with the index of the lookup table being the four Most Significant Bits (MSB) of the average queue size. In this respect, the lookup table stores $2^4=16$ elements. Next, each region is associated with a queue-length averaging parameter, denoted by Alpha. Respective values of this parameter are also stored in a lookup table, with the four MSBs of the instantaneous queue size used as the index of this table, to reduce the implementation computational complexity. Alpha is typically a small positive number less than one, example values of which are given in FIG. 7. Appropriate values of Alpha are found either empirically or through software simulations. To simplify implementation, Alpha values are obtained as $2^{-k}$, where k is an integer. Finally, a partial packet discard (PPD) is initiated when a cell is discarded due to buffer starvation. The aforementioned FIG. 7 is a table that shows the correlation between either the queue size or the average queue size and Alpha values with varying Packet-count threshold values (F(n) or F(n,m) values) with a congestion threshold of 25%, a cell count threshold of 210 cells, and a switch buffer size of 8192 cells per port.

A connection table stores all relevant information about each connection. This information includes two state variables associated with SPEPD, which are maintained for each eligible connection. The first state variable is used to store the state of discard, namely IDLE, EPD and PPD, while the second state variable is used to indicate whether the last cell received from the connection is an end-of-packet cell.

In addition, four global variables are maintained for each class of traffic to which the SPEPD scheme applies. The first global variable is used to count the number of cells queued, denoted as QSize in FIGS. 3 and 4. The second global variable is used to store the average number of cells queued, denoted as AvQSize in FIG. 3 and 4. The third global variable is used to count the number of packets that have entered the system since the last packet discard, denoted as PkCnt in the FIG. 3. The fourth global variable is used to count the number of cell arrivals since the last queue-size averaging event, denoted as ClCnt in FIG. 3 and 4.

Finally, two fixed parameters are maintained for each class of traffic. The first fixed parameter is the congestion threshold, denoted as CongThr in FIG. 3. The counting of packets is disabled when the average queue size is below this threshold. The second fixed parameter is the cell counter threshold, denoted as ClCntThr in FIG. 4. The new average queue size value is calculated when the number of cell arrivals is equal to this threshold. The flowchart of a single-priority SPEPD scheme is shown in FIG. 3, which is described above. The calculation of average queue size is depicted by the flowchart shown in FIG. 4, as described above.

Figure 5:
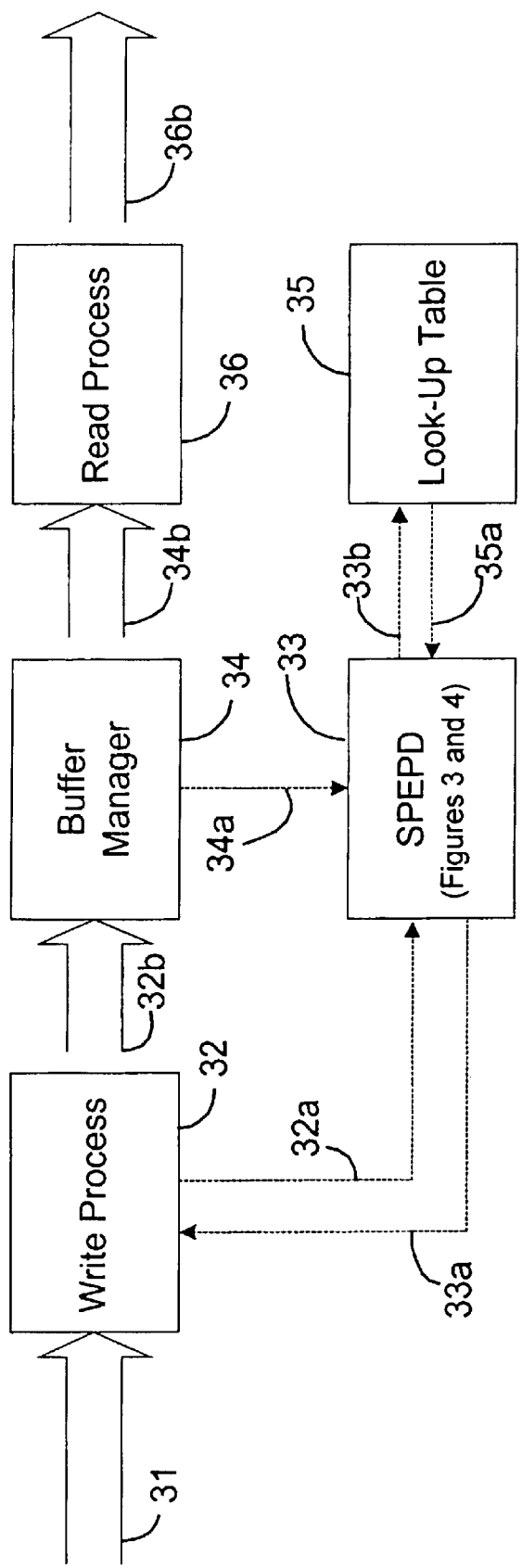
FIG. 5 illustrates in a block diagram a hardware embodiment of the SPEPD process shown in FIGS. 3 and 4.

FIG. 5 illustrates in a block diagram a hardware embodiment of the SPEPD process in accordance with this invention. In this embodiment, incoming traffic 31 is routed to a Write process 32, which appends internal headers to each cell, and obtains a buffer address with which to store the cell. The Write Process 32 provides an SPEPD block 33, which is described in detail in FIGS. 3 and 4, with the connection ID 32a of an arriving cell. In turn the SPEPD block 33 provides the Write process 32 with decision information 33a as to whether the cell should be buffered or discarded. A Buffer Manager 34 receives all the cells that are to be buffered 32b from the Write process 32, and then handles the overall accounting of buffer space. The Buffer Manager 34 provides the queue size 34a to the SPEPD block 33. The SPEPD block 33 causes the packet-count threshold information and queue-length averaging parameters 35a to be retrieved from a Lookup Table 35, in order to realize a better performance and avoid computationally expensive operations. These parameters are obtained from the four MSBs of the average and instantaneous queue sizes 33b respectively. The Buffer Manager 34 passes the buffered version of its input 34b to the Read Process 36. The Read Process 36 handles any processing that is required for any outgoing cell. The Outgoing Traffic 36a is the final product of the SPEPD hardware embodiment.

Figure 6:
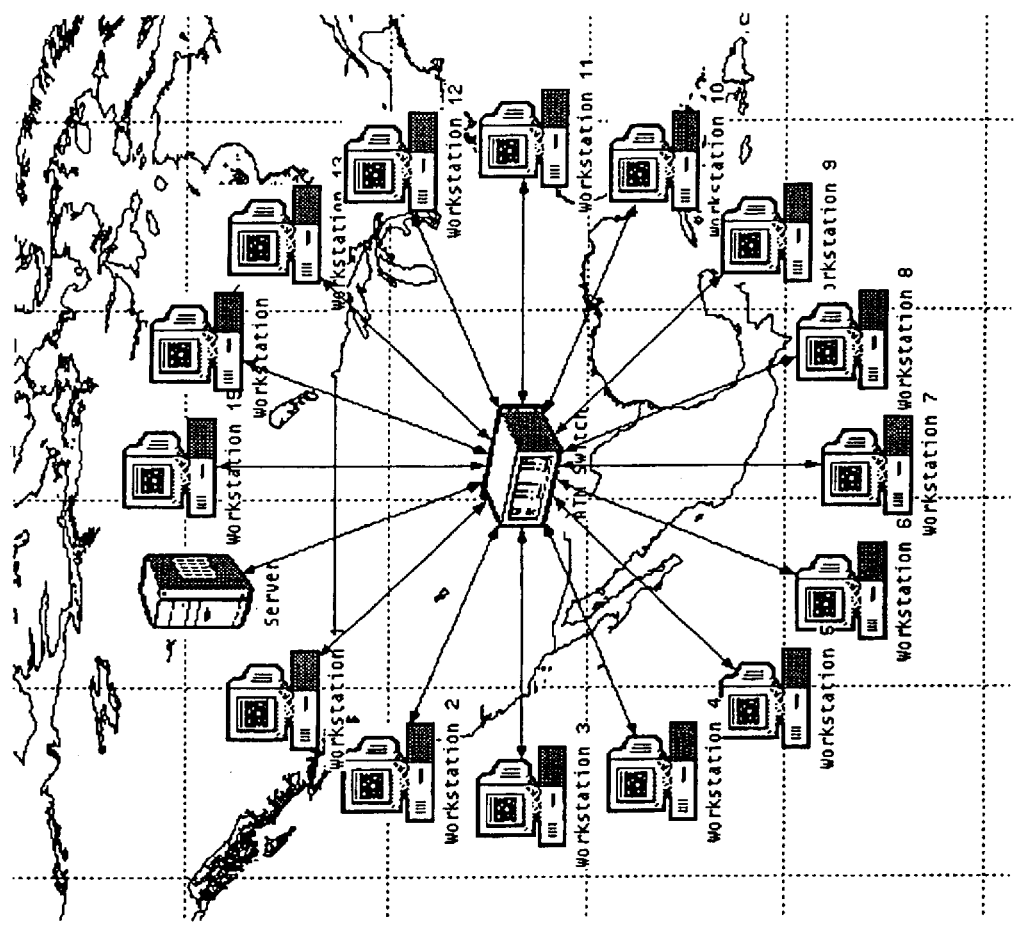
FIG. 6 illustrates, in a high-level network diagram, a network set-up used for SPEPD simulations.

To demonstrate the performance advantage of the SPEPD scheme of this invention over the conventional EPD scheme, a performance evaluation through software simulations has been conducted and relevant results are provided herein. The obtained simulation results are presented for a network as shown in FIG. 6. FIG. 6 illustrates a high level network diagram consisting of 15 networked workstations (Workstations 1–15) and a server, at different geographic locations, connected, bidirectionally, to an ATM switch using industry standard T1 links.

In the simulation, each workstation generates TCP/IP traffic that incorporates industry standard File Transfer Protocol (FTP). Each FTP session connects a workstation to the server, through the ATM switch. Each workstation is set to generate 270 TCP sessions per hour, stochastically distributed according to a Poisson distribution. Each TCP session is an upload FTP session with an average upload size of 128 KB, stochastically distributed according to a Normal distribution. The TCP model used is based on the industry standards known as Request For Comment (RFC) 793 and RFC 1122. The propagation delay in each T1 link connecting either a workstation or the server with the ATM switch is 125 ms, which is typical of ground-to-satellite delays for Geo-stationary (GEO) satellites. Finally, the average load on the link from the ATM switch to the server is approximately 76%.

Two different scenarios are considered. In the first scenario, the ATM switch employs the conventional EPD method and the congestion threshold for EPD is set to 75% of the switch buffer size, which is 8192 cells per port. In the second scenario, the ATM switch employs the SPEPD method of this invention and the SPEPD parameters used in the simulation are shown in FIG. 7, which is described earlier.

Figure 8:
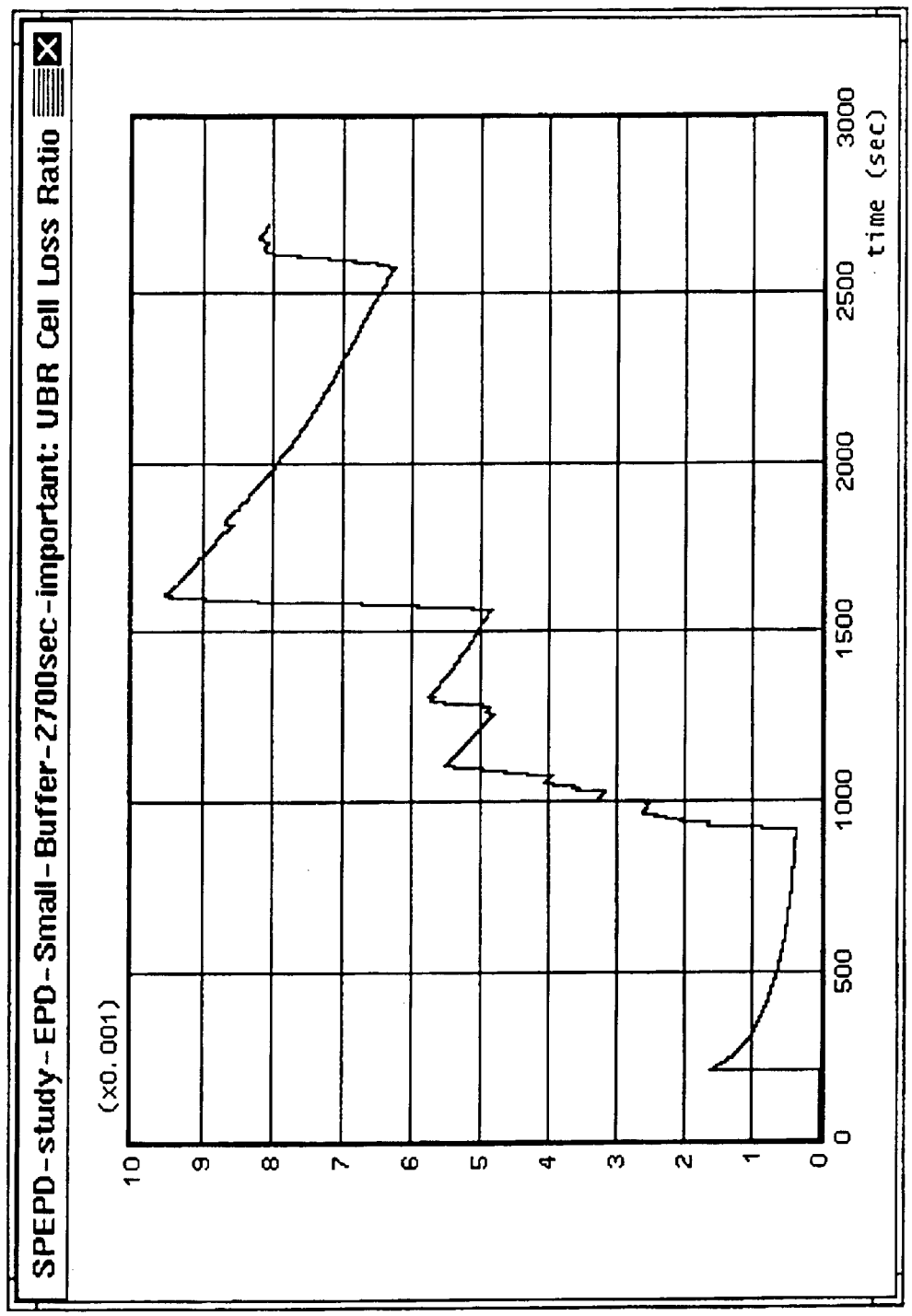
FIG. 8 illustrates, in a graph, the Cell Loss Ratio for TCP Traffic measured at the ATM switch when a conventional EPD scheme is used.
Figure 9:
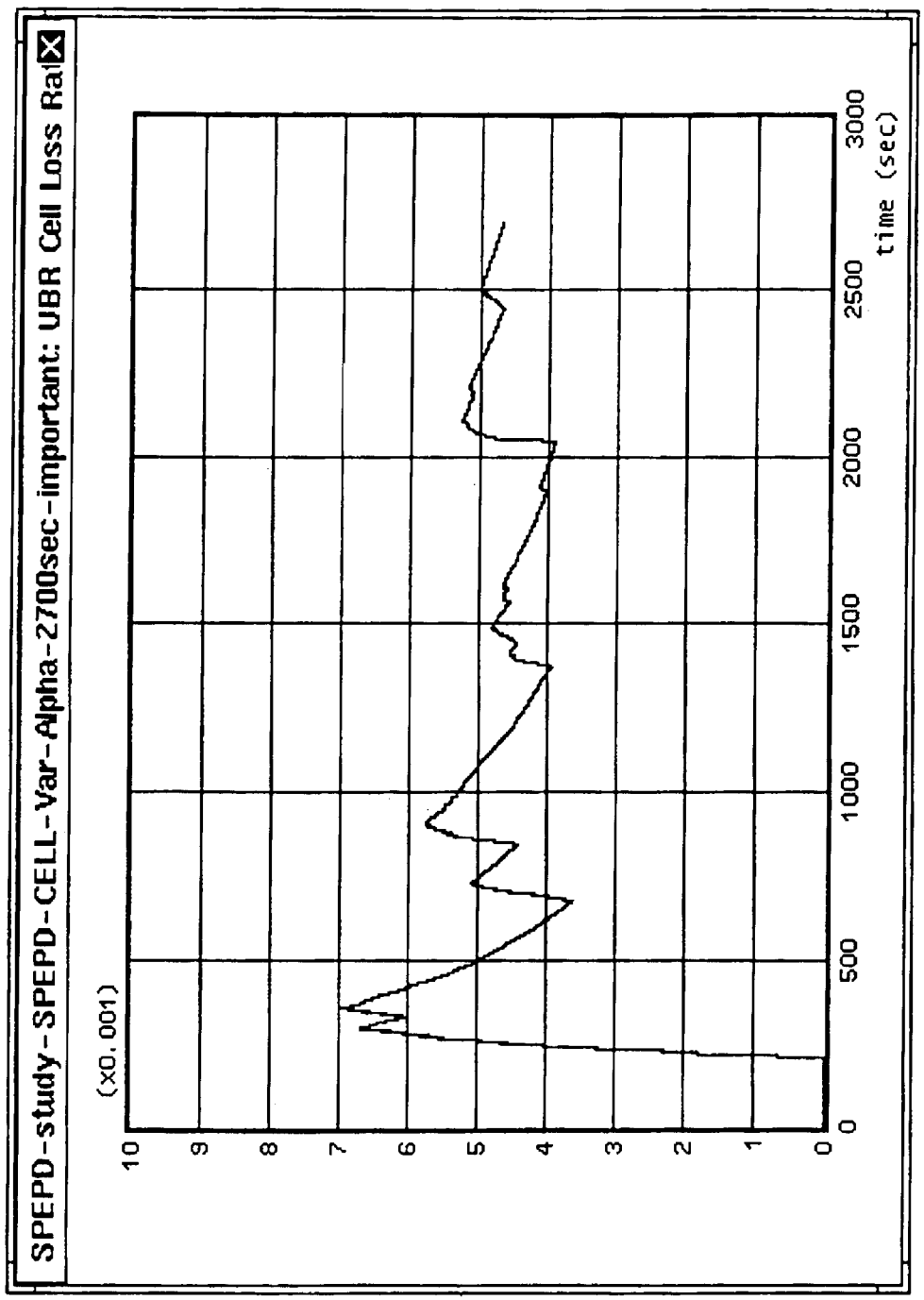
FIG. 9 illustrates, in a graph, the Cell Loss Ratio for TCP Traffic measured at the ATM switch when an SPEPD scheme is used in accordance with this invention.
Figure 10:
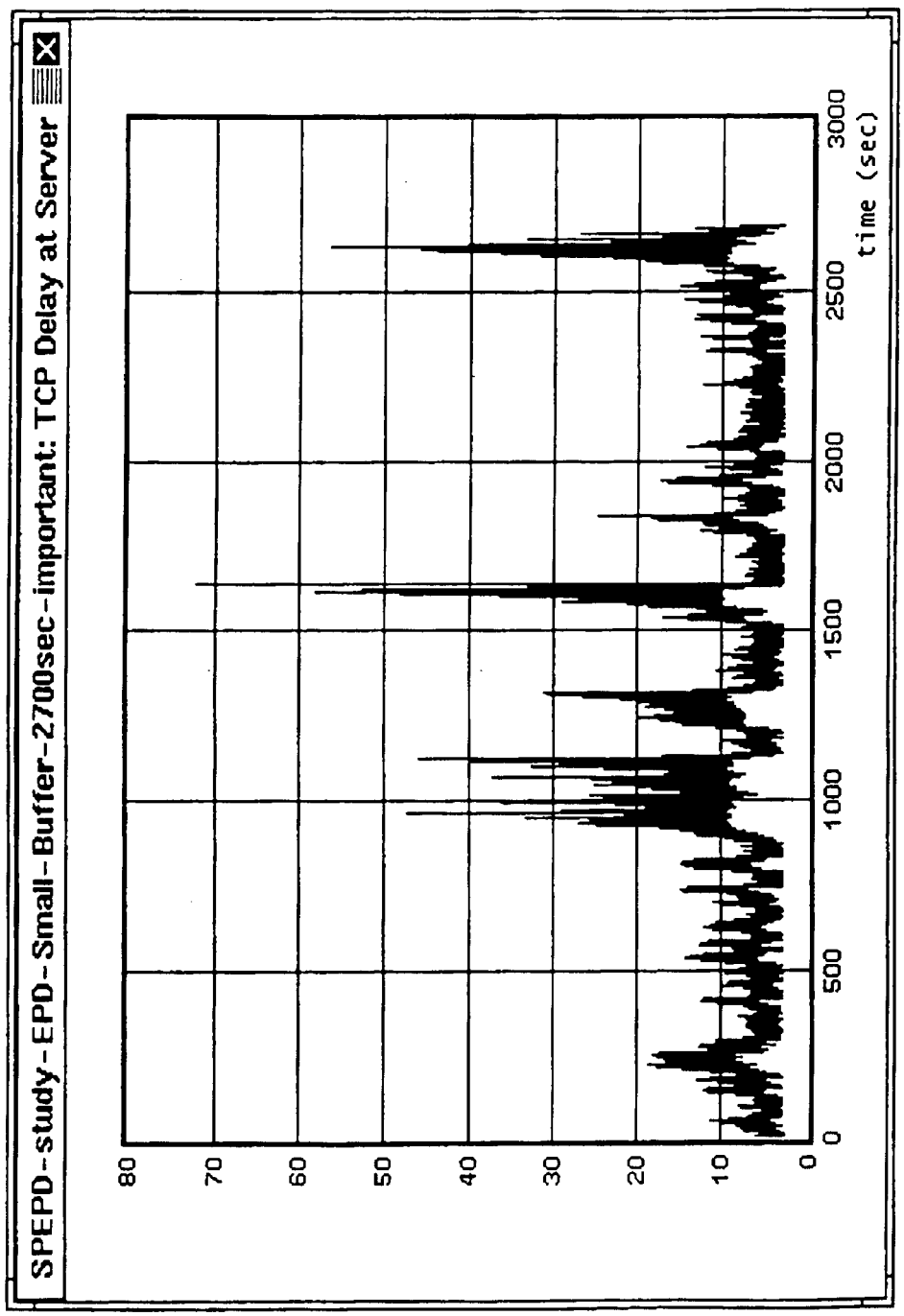
FIG. 10 illustrates, in a graph, the TCP Delay as measured at the Server when a conventional EPD scheme is used.
Figure 11:
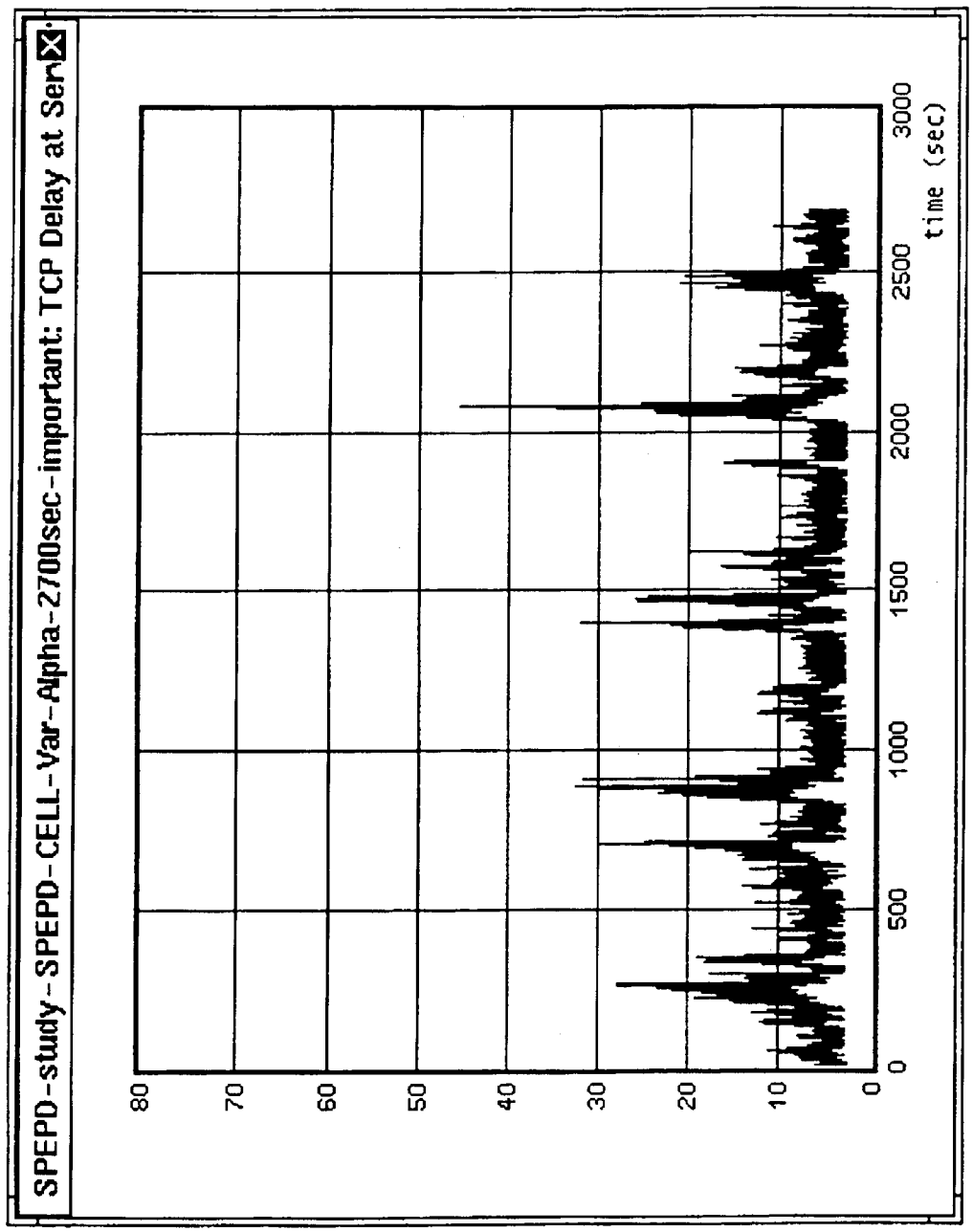
FIG. 11 illustrates, in a graph, the TCP Delay measured at the Server when an SPEPD scheme is used in accordance with this invention.

FIGS. 8 and 9 depict the cell loss ratio for TCP traffic transported using Unspecified Bit Rate (UBR) service, and measured at the ATM switch for the two respective cases using the EPD and SPEPD methods. FIGS. 10 and 11 depict the average TCP delay measured at the server for the same two respective cases using the EPD and SPEPD methods. These four figures confirm the superior performance of the SPEPD method with respect to the conventional EPD techniques. By performing an earlier packet discard than in the EPD method, and by spacing packet discard over multiple packets, the SPEPD method avoids the problem of global TCP synchronization, which results in shorter congestion periods, a reduced cell loss ratio by almost a factor of 2, and a lower TCP delay; The maximum TCP delay observed during simulation is close to 80 seconds for the case of EPD and close to 50 seconds for the case of SPEPD.

Due to its simple implementation and performance results that are superior to conventional techniques, it is foreseeable that the SPEPD method will find application in numerous telecommunication fields including Traffic Management, both terrestrial- and satellite-based ATM switches, and ATM Terminals and Gateways.

Of course, numerous variations and adaptations may be made to the particular embodiments of the invention described above, without departing from the spirit and scope of the invention, which is defined in the claims. As an example, the SPEPD embodiments as described above use an arrival-based scheme, wherein the calculations of the conditions of the queues and the like are done upon the arrival of a new packet. Nonetheless, in an alternative embodiment using a departure-based scheme, the calculations are done at the departure of a packet, without departing from the main spirit and scope of the invention. Though performance may suffer slightly with this approach, a departure-based SPEPD method is feasible, and should be considered as an alternative embodiment of this invention.

What is claimed is:

1. A system for controlling traffic congestion within a buffered data switching network having a predetermined total buffer size, said system comprising:
   (a) a packet counter for counting a number of newly arriving packets in the switching network; and
   (b) calculation means for calculating an average queue size, $\overline{Q}_t$, at time t as $$\overline{Q}_t = \overline{Q}_{t-1} \times (1-\text{Alpha}) + Q_t \times \text{Alpha}$$

where $Q_t$ is an instantaneous queue size, $\overline{Q}_{t-1}$ is the average queue size at time t−1, and Alpha is a queue-length averaging parameter;
   (c) threshold means for setting a packet-count threshold in accordance with the average queue size, for discarding a packet when the number of newly arriving packets reaches the packet-count threshold and when the average queue size exceeds a congestion threshold, and for resetting the packet counter when a packet is discarded.

2. The system as in claim 1, wherein the calculation means includes means to regularly updates the average queue size using an exponential averaging technique.

3. The system as in claim 1, wherein Alpha is assigned a value between zero and one.

4. The system as in claim 1, wherein a progressively increasing value of Alpha is assigned with increasing level of traffic congestion.

5. The system as in claim 4, wherein the level of traffic congestion is indicated by the instantaneous queue size.

6. The system as in claim 1, wherein the average queue size is updated after a predetermined number of cells have arrived since a previous packet discard.

7. The system as in claim 1, wherein the average queue size is updated after a predetermined period of time has elapsed since a previous packet discard.

8. The system as in claim 1, further comprising means for applying a priority scheme for discarding packets, which provides a differentiated service among service classes sharing a common buffer.

9. The system as in claim 1, wherein the threshold means uses a look-up table.

10. The system as in claim 1, wherein the threshold means sets the packet-count threshold upon arrival of a new packet Into the system.

11. The system as in claim 1, wherein the threshold means sets the packet-count threshold upon departure of a packet from the system.

12. A system for controlling traffic congestion within a buffered data switching network having a predetermined total buffer size the data switching network having a queue with a queue size, said system comprising:
   (a) a packet counter for counting a number of newly arriving packets in the switching network;
   (b) calculation means for calculating an average queue size; and
   (c) threshold means for dividing the total queue size into a preselected number of N regions, for setting a packet-count threshold in accordance with the average queue size by using a descending staircase function F(n), for discarding one of every F(n) packets when the average queue size is in a buffer region n, $1 \leq n \leq N$ and for resetting the packet counter when a packet is discarded.

13. The system as in claim 12, further comprising means for detecting traffic congestion by setting a congestion threshold and comparing the average queue size with the congestion threshold, such that a congestion condition is indicated by the average queue size being equal to or above the congestion threshold, and an absence of congestion is indicated otherwise.

14. The system as in claim 13, wherein the packet is discarded only during the congestion condition.

15. The system as in claim 13, wherein the packet counter begins to operate when traffic congestion is detected, and halts operation when an absence of traffic congestion is detected.

16. The system as in claim 12, wherein the threshold means further includes means for dividing the total queue size into a pre-selected number of M regions, for high-priority traffic defining a high-priority congestion threshold, and the pre-selected number of N regions for low-priority traffic defining a low-priority congestion threshold, wherein the threshold means sets the packet-count threshold by using two functions F(n,m) and F(m), such that:
   when the average queue size of high-priority traffic is above the high-priority congestion threshold and is in the buffer region m, $1 \leq m \leq M$, one of every F(m) high priority packets is discarded; and
   when the average queue size of low-priority traffic is above the low-priorty congestion threshold and is in the buffer region n, $1 \leq n \leq N$, one of every F(n,m) low priority packets is discarded.

17. The system as in claim 16, wherein the function F(m) is a descending staircase function in the buffer region m, and the function F(n,m) is a multivariable function of m and n, which has a descending staircase behaviour in the buffer region n for a fixed value of m.

18. A method for controlling traffic congestion within a buffered data switching network having a predetermined total buffer size, said method comprising the steps of:
   (a) counting a number of newly arriving packets;
   (b) calculating an average queue size wherein the average queue size at time t is calculated as;

$$\overline{Q}_t = \overline{Q}_{t-1} \times (1-\text{Alpha}) + Q_t \times \text{Alpha}$$

where $Q_t$ is an instantaneous queue size, $\overline{Q}_{-1}$ is the average queue size at time t-1, and Alpha is a queue-length averaging parameter;

(c) setting a packet-count threshold; and
   (d) discarding a packet and restarting the counting of newly arriving packets, when the number of newly arriving packets reaches the packet-count threshold and the average queue size exceeds a congestion threshold.

19. The method as in claim 18, wherein the calculating step regularly updates the average queue size using an exponential averaging technique.

20. The method as in claim 19, wherein the average queue size is updated after a predetermined number of cells have arrived since a previous packet discard.

21. The method as in claim 19, wherein the average queue size is updated after a predetermined period of time has elapsed since a previous packet discard.

22. The method as in claim 18, wherein Alpha is assigned a value between zero and one.

23. The method as in claim 18, wherein a progressively increasing value of Alpha is assigned with increasing level of traffic congestion.

24. The method as in claim 23, wherein the level of traffic congestion is indicated by the instantaneous queue size.

25. The method as in claim 18, further comprising a step of applying a priority scheme for discarding packets, which provides a differentiated service among service classes sharing a common buffer.

26. A method for controlling traffic congestion within a buffered data switching network having a predetermined total buffer size, said method comprising:
   (a) counting a number of newly arriving packets;
   (b) calculating an average queue size;
   (c) dividing the predetermined total buffer size into a pre-selected number of N regions;
   (d) setting a packet-count threshold in accordance with a descending staircase function F(n); and
   (e) discarding one of every F(n) packets and restarting the counting of newly arriving packets, when the average queue size is in a buffer region n, $1 \leq n \leq N$.

27. The method as in claim 26, further comprising a step of detecting traffic congestion by setting a congestion threshold and comparing the average queue size with the congestion threshold, such that a congestion condition is indicated by the average queue size being above the congestion threshold, and an absence of congestion is indicated otherwise.

28. The method as in claim 27, wherein the packet is discarded only during the congestion condition.

29. The method as in claim 26, wherein the step of dividing the predetermined total buffer size includes dividing the predetermined total buffer size into both a pre-selected number of M regions, for high-priority traffic defining a high-priority congestion threshold, and a pre-selected number of N regions for low-priority traffic defining a low-priority congestion threshold, wherein the step of setting the packet-count threshold sets the packet-count threshold by using two functions F(n,m) and F(m), and wherein the step of discarding includes discarding one of every F(m) high priority packets when the average queue size of high-priority traffic is above the highpriority congestion threshold and is in the buffer region m, $1 \leq m \leq M$, and discarding one of every F(n,m) low priority packets when the average queue size of low-priority traffic is above the low-priority congestion threshold and is in the buffer region n, $1 \leq n \leq N$.

30. The method as in claim 29, wherein the function F(m) is a descending staircase function in the buffer region m, and the function F(n,m) is a multivariable function of m and n, which has a descending staircase behaviour in the buffer region n for a fixed value of m.

* * * * *